United States Patent
Lazzarin et al.

(10) Patent No.: US 9,523,445 B2
(45) Date of Patent: *Dec. 20, 2016

(54) SELF-PROPELLED UNDERWATER VEHICLES AND SYSTEMS FOR UNDERGROUND LAYING A CONTINUOUS ELONGATED MEMBER IN A BED OF A BODY OF WATER

(71) Applicant: SAIPEM S.P.A., San Donato Milanese (IT)

(72) Inventors: Diego Lazzarin, Treviso (IT); Massimo Fontolan, Zero Branco (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,986

(22) Filed: Nov. 5, 2014

(65) Prior Publication Data

US 2015/0063916 A1    Mar. 5, 2015

Related U.S. Application Data

(63) Continuation of application No. 13/062,157, filed as application No. PCT/IB2009/006734 on Sep. 3, 2009, now Pat. No. 8,899,877.

(30) Foreign Application Priority Data

Sep. 4, 2008   (IT) .............................. MI2008A1586

(51) Int. Cl.
| F16L 1/16 | (2006.01) |
| F16L 1/12 | (2006.01) |

(Continued)

(52) U.S. Cl.
CPC ................. *F16L 1/16* (2013.01); *B63G 8/001* (2013.01); *E02F 5/04* (2013.01); *E02F 5/08* (2013.01);
(Continued)

(58) Field of Classification Search
USPC .................................. 405/159–166, 180–183
See application file for complete search history.

(56) References Cited

U.S. PATENT DOCUMENTS

| 2,765,548 A | 10/1956 | Glaser |
| 3,292,379 A | 12/1966 | McElvany |

(Continued)

FOREIGN PATENT DOCUMENTS

| DE | 2058336 | 8/1971 |
| FR | 2813110 | 2/2002 |

(Continued)

OTHER PUBLICATIONS

U.S. Appl. No. 13/062,157, filed Sep. 15, 2011, Lazzarin et al.
(Continued)

*Primary Examiner* — Amber Anderson
*Assistant Examiner* — Kyle Armstrong
(74) *Attorney, Agent, or Firm* — Dorsey & Whitney LLP

(57) ABSTRACT

A self-propelled underwater vehicle for underground laying a continuous elongated member in a bed of a body of water having a work assembly, which is configured to be set, at least partly, into the bed, and is provided with two facing supporting walls for delimiting a space there-between and supporting two opposite scarp slopes; and drive assemblies, which are arranged on opposite sides of the work assembly and are configured to rest on the bed and advancing the work assembly in a travelling direction.

11 Claims, 7 Drawing Sheets

(51) Int. Cl.
*E02F 5/04* (2006.01)
*E02F 5/08* (2006.01)
*E02F 5/10* (2006.01)
*E02F 5/12* (2006.01)
*B63G 8/00* (2006.01)

(52) U.S. Cl.
CPC .............. *E02F 5/101* (2013.01); *E02F 5/103* (2013.01); *E02F 5/105* (2013.01); *E02F 5/107* (2013.01); *E02F 5/108* (2013.01); *E02F 5/109* (2013.01); *E02F 5/125* (2013.01); *F16L 1/12* (2013.01); *F16L 1/165* (2013.01); *B63G 2008/002* (2013.01)

(56) References Cited

U.S. PATENT DOCUMENTS

| | | | |
|---|---|---|---|
| 4,011,727 | A | 3/1977 | Suzuki et al. |
| 4,117,689 | A | 10/1978 | Martin |
| 4,295,757 | A | 10/1981 | Gaspar |
| 4,338,042 | A | 7/1982 | Faldi |
| 4,588,329 | A | 5/1986 | Gilchrist, Jr. |
| 4,986,697 | A | 1/1991 | Lynch |
| 5,788,418 | A | 8/1998 | Kuehn |
| 6,022,173 | A | 2/2000 | Saxon |
| 6,922,922 | B2 | 8/2005 | Cheramie |

FOREIGN PATENT DOCUMENTS

| | | |
|---|---|---|
| GB | 2163198 | 2/1986 |
| JP | 2000008405 | 1/2000 |
| WO | WO 2004016366 | 2/2004 |
| WO | WO 2005005736 | 1/2005 |

OTHER PUBLICATIONS

International Search Report and Written Opinion from International Application No. PCT/IB2009/006734 mailed Dec. 16, 2009.
U.S. Appl. No. 13/062,157, Apr. 24, 2013, Office Action.
U.S. Appl. No. 13/062,157, Oct. 11, 2013, Office Action.
U.S. Appl. No. 13/062,157, Feb. 6, 2014, Office Action.
U.S. Appl. No. 13/062,157, Mar. 7, 2014, Office Action.
U.S. Appl. No. 13/062,157, Jul. 30, 2014, Notice of Allowance.

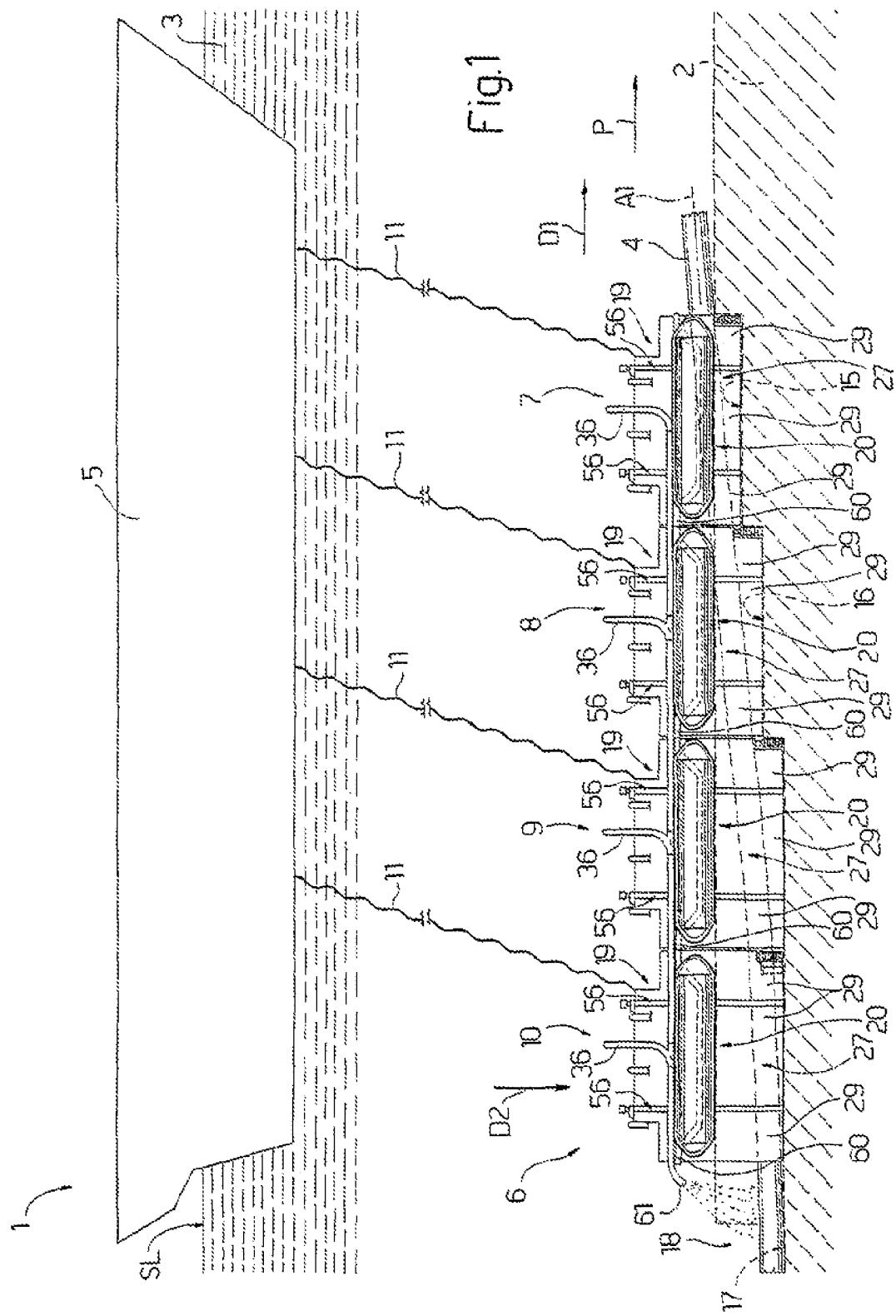

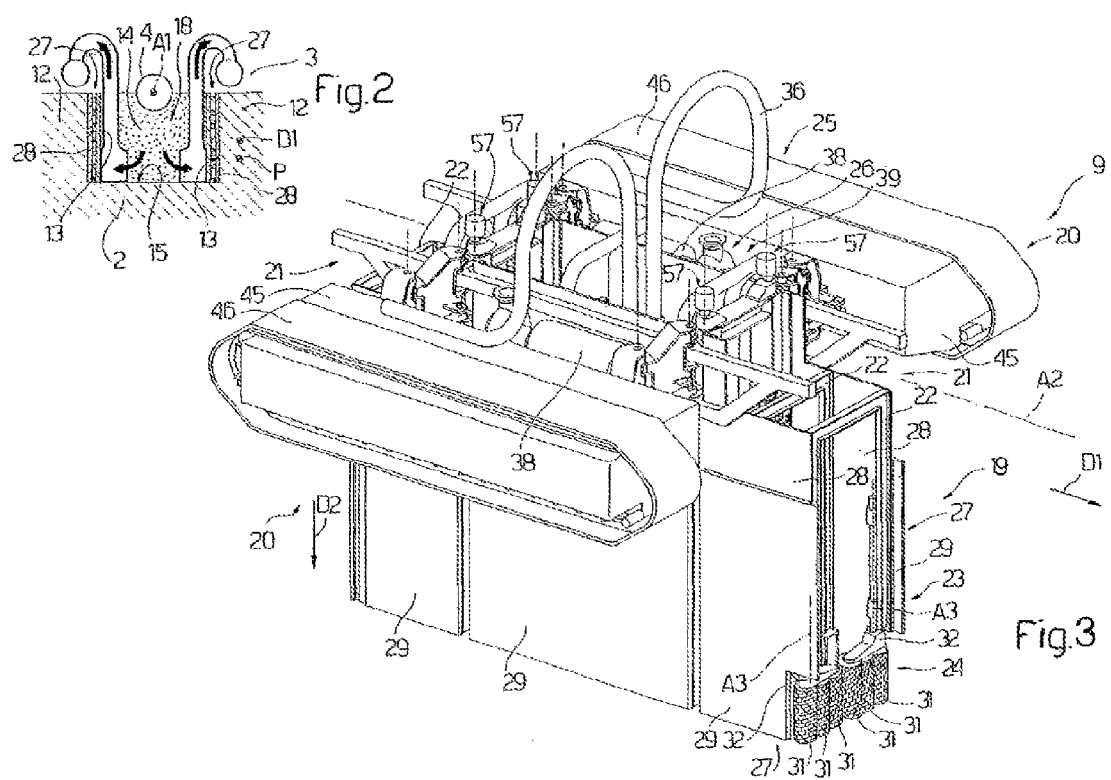

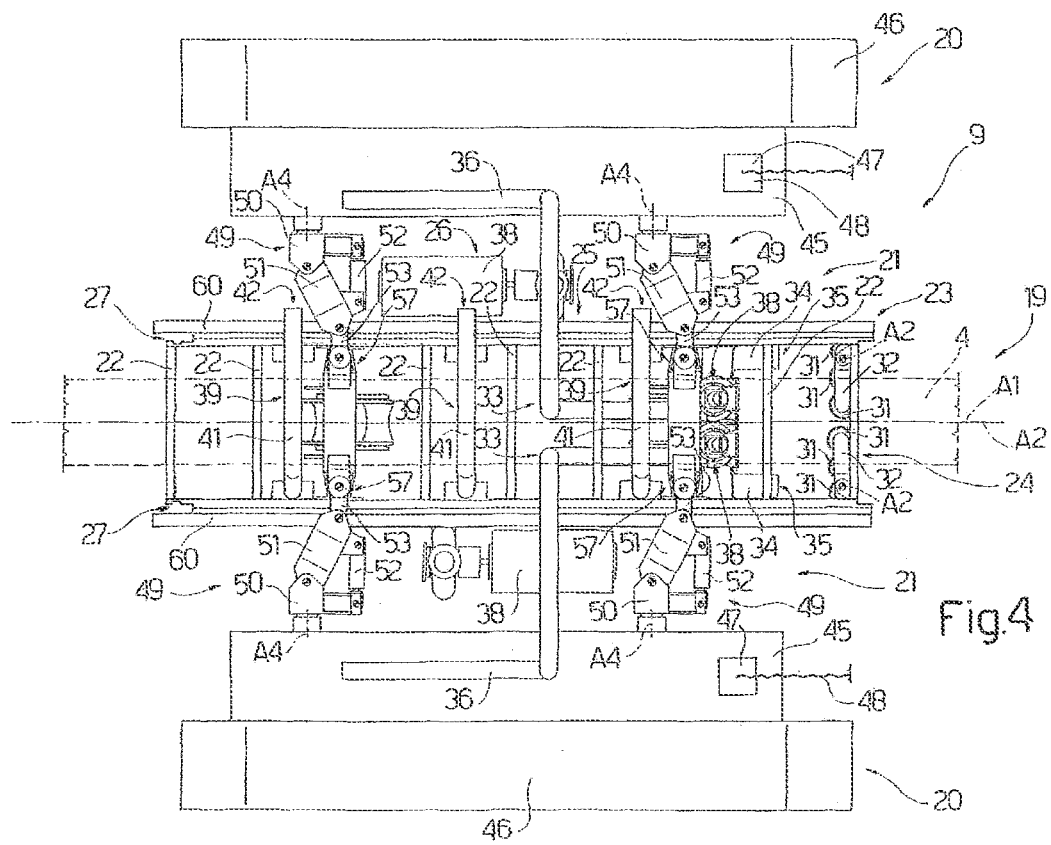

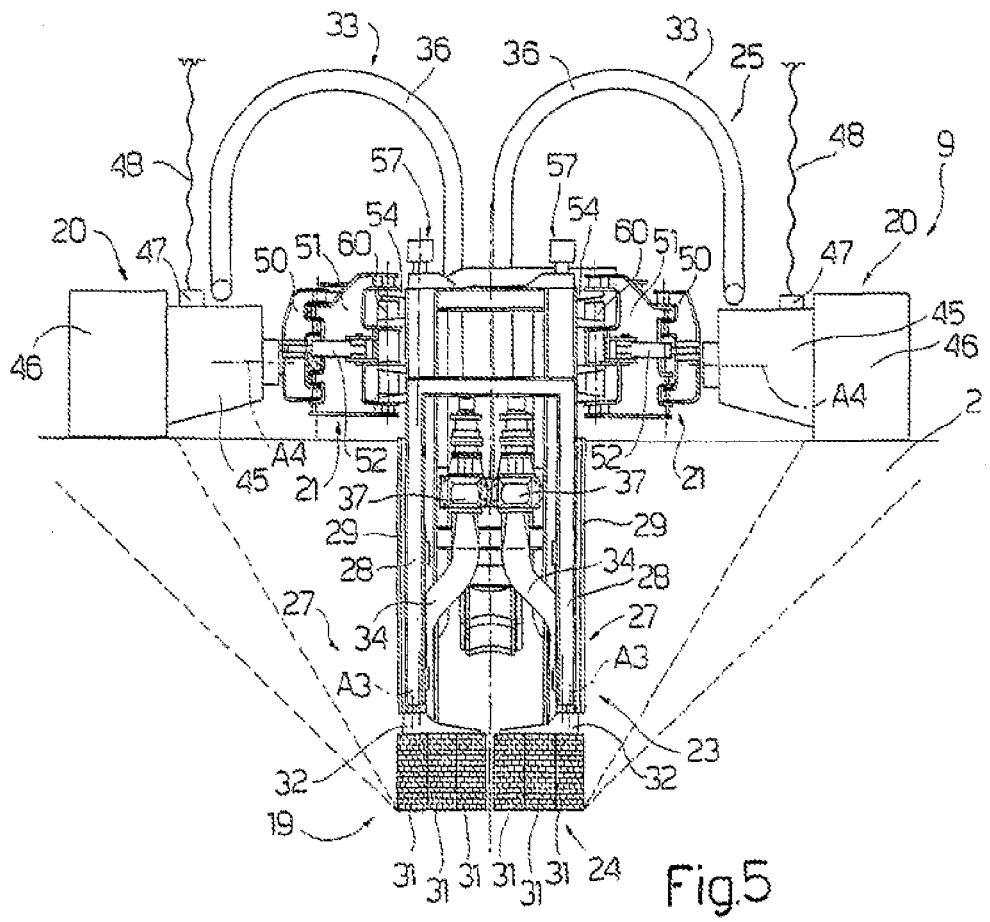
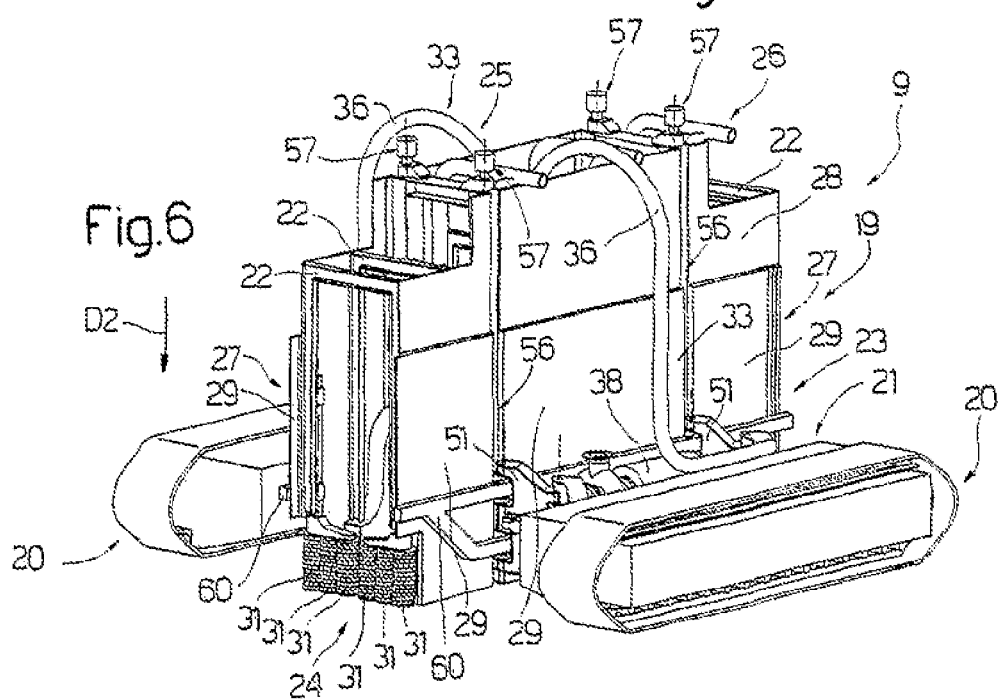

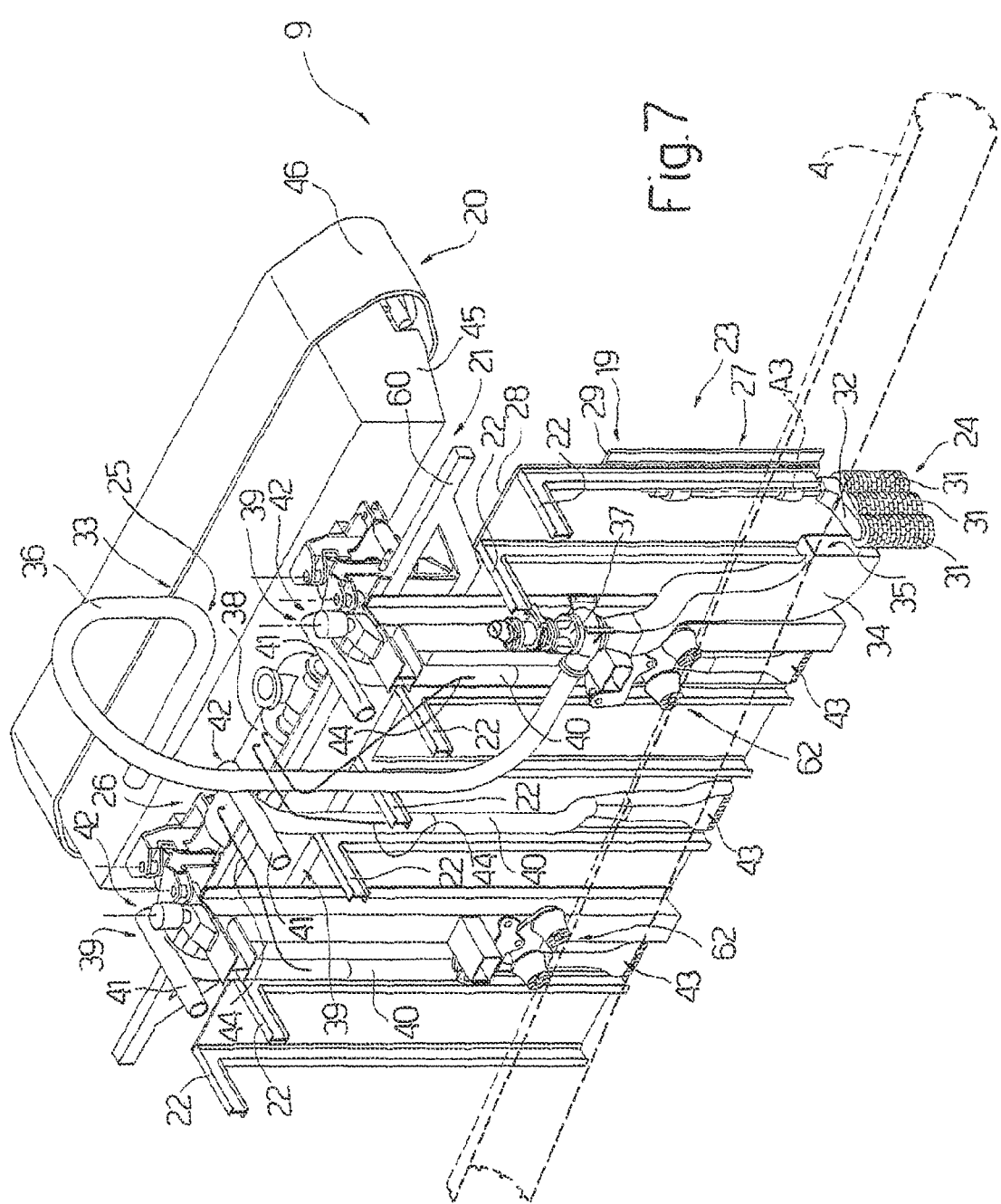

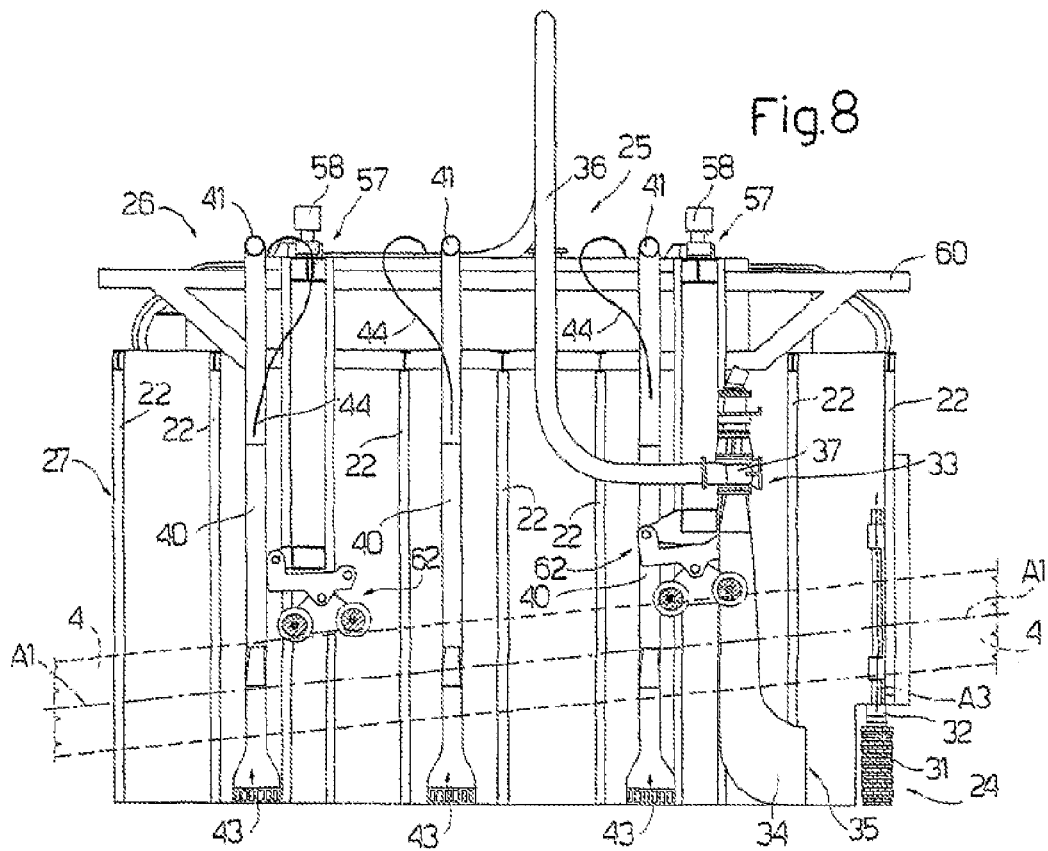
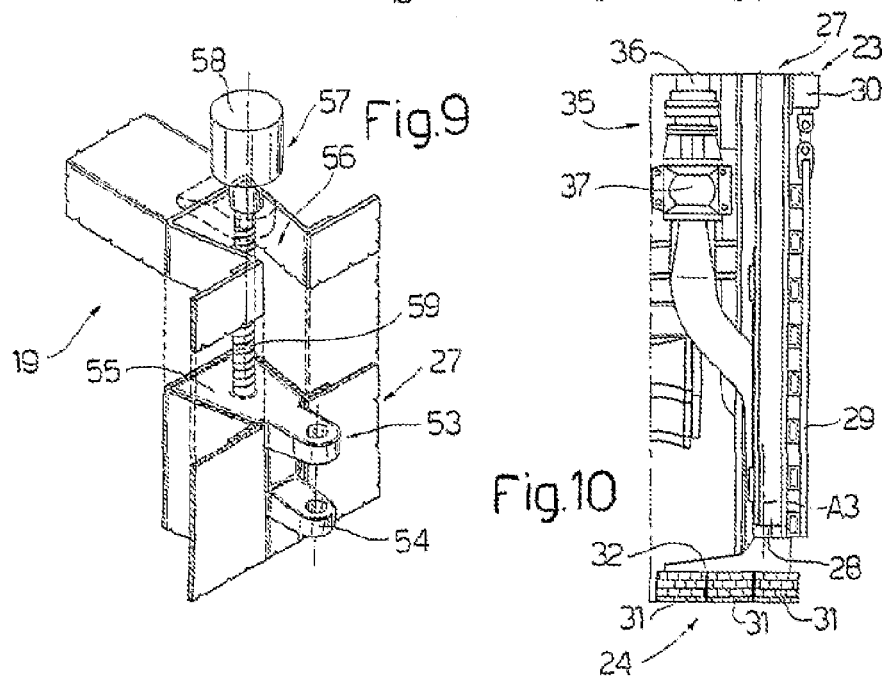

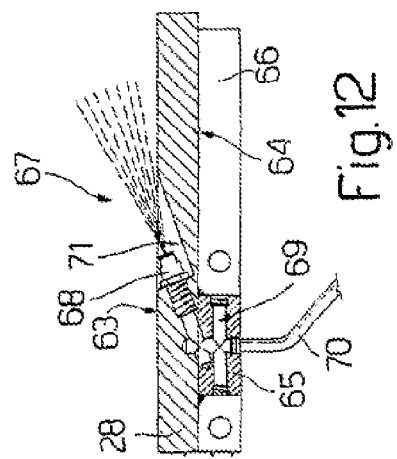
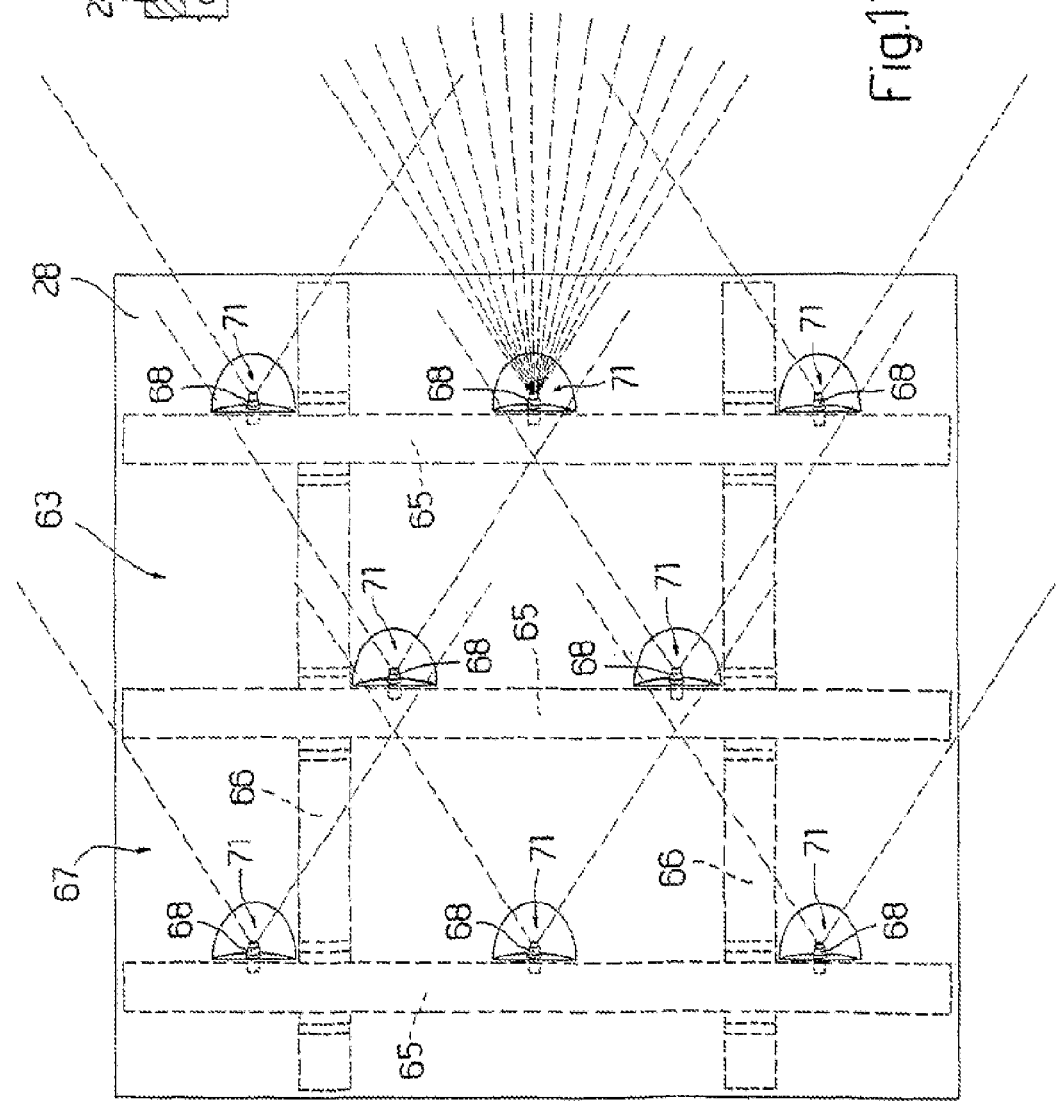

SELF-PROPELLED UNDERWATER VEHICLES AND SYSTEMS FOR UNDERGROUND LAYING A CONTINUOUS ELONGATED MEMBER IN A BED OF A BODY OF WATER

CROSS-REFERENCE TO RELATED APPLICATIONS

This application is a continuation of U.S. application Ser. No. 13/062,157 filed on 15 Sep. 2011, which is a U.S. Nationalization of PCT International Application No. PCT/IB2009/006734 filed 3 Sep. 2009, which claims priority to Italian Patent Application No. MI2008A001586 filed 4 Sep. 2008, the entireties of the foregoing applications are incorporated herein by reference.

TECHNICAL FIELD

Embodiments of the present invention relate to a method of underground laying a continuous elongated member, such as an underwater pipeline, cable, umbilical, pipe and/or cable bundle, in the bed of a body of water.

BACKGROUND ART

In-bed laying an underwater pipeline normally comprises laying the pipeline along a given path on the bed of the body of water; fragmenting a soil mass along the path to a given depth; digging a trench or generally removing the fragmented soil mass; and possibly burying the pipeline.

More specifically, currently used known techniques comprise removing the fragmented soil mass to form a trench in the bed of the body of water; and laying the pipeline directly into the trench. The pipeline may later be covered over with the removed soil mass to fill in the trench and bury the pipeline.

Underwater pipelines carrying hydrocarbons are normally laid completely or partly underground for various reasons, some of which are discussed below. Underwater pipelines are normally laid underground close to shore approaches and in relatively shallow water, to protect them from damage by blunt objects, such as anchors or fishing nets, and are sometimes laid underground to protect them from natural agents, such as wave motion and currents, which may result in severe stress. That is, when a pipeline is laid on the bed of a body of water, it may span two supporting areas of the bed, i.e. a portion of the pipeline may be raised off the bed; in which case, the pipeline is particularly exposed to, and offers little resistance to the movements induced by, wave motion and currents. Underground laying may also be required for reasons of thermal instability, which result in deformation (upheaval/lateral buckling) of the pipeline, or to protect the pipeline from the mechanical action of ice, which, in particularly shallow water, may result in scouring of the bed.

To avoid damage, the pipeline often need simply be laid at the bottom of a suitably deep trench dug before laying (pre-trenching) or more often after laying the pipeline (post-trenching). At times, the protection afforded by the trench and eventual natural backfilling of the trench is not enough, and the pipeline must be buried using the fragmented soil mass removed from the trench, or any available soil mass alongside the trench.

The depth of the trench is normally such that the top line of the pipeline is roughly a meter below the surface of the bed, though severe environmental conditions may sometimes call for deeper trenches (of several meter). Trenching and backfilling are performed using digging equipment, and post-trenching (with the pipeline already laid on the bed) is the normal practice, to dig and backfill the trench in one go.

One method of in-bed laying underwater pipelines is described in Patent Application WO 2005/005736. This is a post-trenching method comprising the steps of fragmenting a soil mass in the bed to open the way; and drawing along the opening a huge plough, to form a trench, and vertical supporting walls connected to the plough and which respectively support two opposite soil masses bounded by two substantially vertical scarp slopes.

The above method has the drawback of being highly energy-intensive, due partly to the plough, and partly to friction between the supporting walls and the two soil masses. And energy consumption increases exponentially alongside an increase in trench depth.

Another method of in-bed laying underwater pipelines is described in Patent Application WO 2004/016366, which proposes fragmenting a soil mass in the bed, and removing the fragmented soil mass using a dredging unit on board a support vessel. That is, the fragmented soil mass is first sucked up from the bed along a dredging path up onto the support vessel, and then dumped back into the trench.

This method is also highly energy-intensive to draw the fragmented soil mass up onto the support vessel. Moreover, the scarp slopes are susceptible to slide; the method is unsuitable for in-depth laying underwater pipelines; and, in the event of slide, the pumps and conduits are called on to remove additional fragmented soil masses, thus further increasing energy consumption.

SUMMARY

One or more embodiments of the present invention provide a method of underground laying an underwater pipeline in the bed of a body of water, designed to eliminate the drawbacks of the known art.

One or more embodiments of the present invention provide a method enabling easy in-depth laying of underwater pipelines in the bed of a body of water.

According to an embodiment of the present invention, there is provided a method of underground laying a continuous elongated member in a bed of a body of water, wherein the continuous elongated member lies on the bed of the body of water along a given path; the method including the steps of:

fragmenting a soil mass in the bed along the given path and under the continuous elongated member, so as to form in the bed two scarp slopes bounding the fragmented soil mass by two soil masses susceptible to slide;

advancing two supporting walls, along the given path in an advancing direction, along the respective two scarp slopes; and transferring the fragmented soil mass between the two supporting walls, so as to promote sinking of the continuous elongated member between the two supporting walls.

Embodiments of the present invention provide for greatly reducing energy consumption by only removing the fragmented soil mass between the supporting walls preventing slide of the soil masses defined by the scarp slopes, thus enabling in-depth laying with the removal of only a small fragmented soil mass in relation to depth.

Another embodiment of the present invention provides a system for underground laying a continuous elongated member in the bed of a body of water.

According to an embodiment of the present invention, there is provided a system for underground laying a continuous elongated member in a bed of a body of water, wherein the continuous elongated member extends on the bed along a given path: the system comprising an underwater vehicle comprising a work assembly which is set into the bed and comprises:

a fragmenting unit for fragmenting a soil mass in the bed along the given path and under the continuous elongated member, so as to form in the bed two scarp slopes bounding the fragmented soil mass by two soil masses susceptible to slide;

a sustaining unit comprising two supporting walls which are advanced, along the given path in an advancing direction, along the respective two scarp slopes; and means for transferring the fragmented soil mass between the two supporting walls, so as to promote sinking of the continuous elongated member between the two supporting walls.

BRIEF DESCRIPTION OF THE DRAWINGS

A number of non-limiting embodiments of the present invention will be described by way of example with reference to the accompanying drawings, in which:

FIG. 1 shows a partly sectioned side view, with parts removed for clarity, of a system for underground laying an underwater pipeline in the bed of a body of water;

FIG. 2 shows a cross section of the bed when digging a trench in which to lay the underwater pipeline;

FIG. 3 shows an isometric view, with parts removed for clarity, of an underwater vehicle of the FIG. 1 system;

FIG. 4 shows a plan view, with parts removed for clarity, of the FIG. 3 underwater vehicle;

FIG. 5 shows a larger-scale front view, with parts removed for clarity, of the FIG. 3 underwater vehicle;

FIG. 6 shows an isometric view, with parts removed for clarity, of the FIG. 3 underwater vehicle in another configuration;

FIG. 7 shows a partly sectioned isometric view, with parts removed for clarity, of the FIG. 3 underwater vehicle;

FIG. 8 shows a side section, with parts removed for clarity, of the FIG. 3 underwater vehicle;

FIG. 9 shows a larger-scale isometric view, with parts removed for clarity, of a detail of the FIG. 3 underwater vehicle;

FIG. 10 shows a front section, with parts removed for clarity, of a detail of the FIG. 3 underwater vehicle;

FIG. 11 shows a larger-scale side view, with parts removed for clarity, of a detail of the FIG. 3 vehicle;

FIG. 12 shows a larger-scale section, with parts removed for clarity, of a detail of the FIG. 11.

DETAILED DESCRIPTION

Underwater Pipeline Underground Laying System

Number 1 in FIG. 1 indicates as a whole a system for underground laying underwater pipelines in a bed 2 of a body of water 3 of level SL.

In the following description, the term "body of water" is intended to mean any stretch of water, such as sea, ocean, lake, etc., and the term "bed" is intended to mean the concave layer of the earth's crust containing the mass of water in the body.

Underground laying system 1 provides for underground laying an underwater pipeline 4, which has an axis A1, extends along a given path P on bed 2, and has been laid beforehand by a known laying vessel not shown in the drawings. Underground laying system 1 comprises a support vessel 5; and a convoy 6 comprising a number of underwater vehicles 7, 8, 9, 10 advanced in an advancing direction D1 along path P.

Though the present description refers specifically to an underwater pipeline, underground laying system 1 provides for underground laying continuous elongated members of all types, such as cables, umbilicals, pipe and/or cable bundles, not shown in the drawings.

Underwater vehicles 7, 8, 9, 10 are guided along path P by support vessel 5. More specifically, support vessel 5 serves to guide vehicles 7, 8, 9, 10 along path P, and to supply vehicles 7, 8, 9, 10 with electric power, control signals, compressed air, hydraulic power, etc., so each underwater vehicle 7, 8, 9, 10 is connected to support vessel 5 by a cable bundle 11.

Each vehicle 7, 8, 9, 10 is designed to:

fragment a respective soil layer of bed 2 to form two soil masses 12 bounded by respective opposite, substantially vertical scarp slopes 13, as shown clearly in FIG. 2, and a fragmented soil mass 14 between the two scarp slopes 13;

support soil masses 12 along scarp slopes 13 (FIG. 2);

transfer the fragmented soil mass 14 between the two opposite scarp slopes 13 (FIG. 2);

guide pipeline 4; and bury pipeline 4 with the removed fragmented soil mass 14.

Underwater vehicles 7, 8, 9, 10 are kept close together to seamlessly sink pipeline 4.

In the FIG. 1 example, underwater vehicle 10 performs no fragmenting function.

The fragmented soil mass 14 is bounded at the bottom by bottom faces 15, 16, 17 increasing gradually in depth in the opposite direction to direction D1.

In other words, underwater vehicles 7, 8, 9, 10 dig a trench 18, on the bottom face 17 of which pipeline 4 is laid and covered with fragmented soil mass 14.

With reference to FIG. 2, for the purpose of this description, the term "scarp slope" is intended to mean a surface connecting rock formations, sediment or terrains at different heights, and, in the example shown, scarp slopes 13 are substantially vertical.

Depending on the depth of trench 18 and the nature of soil mass 12, soil masses 12 bounded by respective scarp slopes 13 must be supported to prevent soil masses 12 from sliding.

For example, a soil mass of granular material, such as sand or gravel, tends to settle into a surface (natural slope) at a given angle, known as natural slope angle, to the horizontal.

If bed 2 is made solely of cohesive rock, on the other hand, there is practically no risk of soil masses 12 sliding at scarp slopes 13. Nevertheless, underground laying system 1 (FIG. 1) is designed to cope with any type of problem, regardless of the geological structure of bed 2.

Underwater Vehicles

The following is a detailed description of underwater vehicle 9, with reference to FIGS. 3-10. Underwater vehicles 7, 8, 10 in FIG. 1 are not described in detail, but are structurally similar to underwater vehicle 9, from which they differ solely as regards the size of certain component parts. Accordingly, the reference numbers used with reference to underwater vehicle 9 also apply to corresponding parts of underwater vehicles 7, 8, 10 in FIG. 1.

In FIG. 3, underwater vehicle 9 extends along an axis A2, and comprises a work assembly 19 which is set into bed 2; two drive assemblies 20 which rest on bed 2 and advance work assembly 19 in direction D1 (FIG. 1); and two connecting assemblies 21, each for connecting a respective drive assembly 20 to work assembly 19, and for adjusting the relative positions of drive assemblies 20 and work assembly 19.

Work assembly 19 comprises a supporting frame 22; a sustaining unit 23; a fragmenting unit 24; a dredging unit 25; and an auxiliary dredging unit 26.

Supporting frame 22 substantially comprises a number of beams, each of which is inverted-U-shaped, as shown more clearly in FIG. 7.

Sustaining unit 23 comprises two opposite supporting walls 27 fixed to frame 22 and parallel to axis A2. As shown more clearly in FIG. 10, each supporting wall 27 comprises a base structure 28; a number of panels 29 connected elastically, preferably by rubber fasteners, to base structure 28; and a number of actuators 30 for inducing vibration in panels 29, preferably in a vertical direction D2 crosswise to axis A2 and parallel to supporting walls 27.

With reference to FIG. 5, fragmenting unit 24 comprises a number of vertical cutters 31 for fragmenting a soil mass cross section of a width substantially equal to the distance between opposite walls 27. Fragmenting unit 24 also comprises two arms 32, each of which supports half the number of cutters 31 and rotates, with respect to frame 22, about a vertical axis A3 (parallel to supporting walls 27) to set cutters 31 to a work position, in which arms 32 are perpendicular to supporting walls 27 and cutters 31 connect opposite supporting walls 27, and a rest position, in which arms 32 are parallel to supporting walls 27, so the pipeline can be placed between the two arms 32 and respective cutters 31.

Dredging unit 25 comprises two dredging devices 33. As shown more clearly in FIG. 8, each dredging device 33 is fitted to underwater vehicle 9 and located at least partly between walls 27. In the example shown, each dredging device 33 comprises a suction conduit 34 having a suction port 35 located at the bottom of supporting wall 27 and, in use, under pipeline 4 (FIG. 1); a delivery hose 36 for unloading the fragmented soil mass 14 downstream from convoy 6 (FIG. 1); and a pump 37 between suction conduit 34 and hose 36.

With reference to FIG. 7, auxiliary dredging unit 26 comprises two pumps 38 (only one shown in FIG. 7) located on opposite sides of sustaining unit 23; and a number of conduits 39 extending between and directly over supporting walls 27. Each conduit 39 comprises two branches 40 respectively adjacent to the inner faces of opposite supporting walls 27; and a header 41 communicating with both branches 40 and having an outlet port 42. Each branch 40 comprises a suction port 43 located close to the bottom of respective supporting wall 27 and facing the opposite supporting wall 27.

Pumps 38 are connected to each branch 40 by a respective hose 44 which generates an upward jet in respective branch 40, so that each conduit 39 acts as an ejector pump between suction ports 43 and outlet port 42.

With reference to FIG. 4, each drive assembly 20 comprises a supporting body 45; and a powered track 46 looped about supporting body 45 and movable about supporting body 45 by known means not shown in the drawings. Supporting body 45 is at least partly hollow, and comprises a control device 47 in turn comprising valves and a pump (not defined in detail), and a pipe 48 connected to the laying vessel to feed/expel air to/from body 45 and so alter the buoyancy of drive assembly 20 and underwater vehicle 9 as a whole. In other words, supporting body 45 is a variable-buoyancy body.

Each connecting assembly 21 comprises two articulated joints 49, each of which comprises a bracket 50 fitted to supporting body 45 to rotate about an axis A4; an arm 51 hinged to bracket 50; and an actuator 52, in particular a hydraulic cylinder, hinged to bracket 50 and arm 51 to form, with bracket 50 and arm 51, a variable-configuration triangle. Arm 51 is in turn hinged to a connecting member 53 fitted to work assembly 19 as shown in FIG. 9.

With reference to FIG. 9, connecting member 53 comprises a fork 54; and a dove-tail prismatic body 55 with a threaded central hole.

With reference to FIG. 6, connecting assembly 21 also comprises four tracks 56 which, in the example shown, are grooves extending along supporting walls 27 in direction D2 (FIG. 1). More specifically, each supporting wall 27 has two tracks 56; and two actuators 57, each located at a respective track 56 and connected to connecting member 53 to move connecting member 53 (FIG. 9) with respect to supporting wall 27.

With reference to FIG. 9, each track 56 has a seat having a dove-tailed cross section and engaged in sliding manner by prismatic body 55.

With reference to FIG. 8, each actuator 57 is fitted to frame 22, and comprises an electric motor 58; and a threaded bar 59 housed in the seat of track 56 and engaging the threaded hole in prismatic body 55 so as to form, with prismatic body 55, a screw-nut screw mechanism.

With reference to FIG. 6, each connecting assembly 21 comprises two tow bars 60 fitted to a respective pair of connecting members 53 and adjacent to a respective supporting wall 27. Each tow bar 60 of underwater vehicle 9 is connected to the respective tow bars of adjacent underwater vehicles 8 and 10, as shown in FIG. 1.

With reference to FIG. 1, hoses 36 of dredging devices 33 all extend downstream from the last underwater vehicle 10 in conveyor 6, and have outlet ports 61 located over pipeline 4, so the material removed by dredging devices 33 is fed back into trench 18 once pipeline 4 is sunk.

With reference to FIG. 8, the work assembly also comprises a number of carriages 62 fitted to frame 22 and located between supporting walls 27 to push pipeline 4 downwards and so aid in sinking pipeline 4.

With reference to FIG. 11, each panel 29 has an outer face 63; an inner face 64 (FIG. 12); and vertical ribs 65 and horizontal ribs 66 for stiffening panel 29.

Panel 29 is equipped with a lubricating device 67 for forming a water film along outer face 63 of panel 29, and which comprises a number of nozzles 68 equally spaced along outer face 63; conduits 69 at vertical ribs 65 (FIG. 12); and a pump (not shown) connected to conduits 69 by hoses 70 (FIG. 12).

Nozzles 68 are housed in recesses 71 in panel 29, so as not to project from outer face 63.

With reference to FIG. 12, each nozzle 68 is oriented to emit a jet at a 20° angle with respect to outer face 63 and in the opposite direction to advancing direction D1 (FIG. 11).

With reference to FIG. 11, the size of the jets and the number of nozzles are selected to cover the whole of outer face 63 with a film of water and so reduce friction between panel 29 and scarp slope 13 (FIG. 2).

Operation of system 1 will be clear from the above description.

Advantages

In addition to the energy-saving advantages already mentioned, the fragmented soil mass is removed by dredging unit 25 and auxiliary dredging unit 26. In many applications, dredging unit 25 is unable to remove all the fragmented soil mass 14 on its own, so the rest of fragmented soil mass 14 is removed by auxiliary dredging unit 26.

Soil masses 12 are prevented from sliding at the fragmenting, removal, and sinking stages, by being confined by supporting walls 27; and friction between supporting walls 27 and soil masses 12 is greatly reduced by vibrating panels 29 contacting soil masses 12 along scarp slopes 13.

Underwater vehicles 7, 8, 9, 10 are highly versatile, and can adjust the position of work assembly 19 with respect to drive assemblies 20 and hence the depth of the work assembly in bed 2.

The distance between drive assemblies 20 and work assembly 19 can also be adjusted. For example, in sandy beds, it is best to keep drive assemblies 20 as far away as possible from work assembly 19, to prevent the weight of drive assemblies 20 from inducing slide of soil masses 12 and so further increasing friction between soil masses 12 and supporting walls 27.

Conversely, in rocky beds, where the above drawback does not apply, it is best to keep drive assemblies 20 as close as possible to work assembly 19, so as to provide greater forward thrust to fragmenting unit 24, which encounters considerable resistance in rocky terrain.

Because of the play between each track 56 and respective connecting member 53 and independent actuators 57, work assembly 19 can be tilted slightly with respect to drive assemblies 20.

Independent actuators 57 enable the two drive assemblies 20 to be set to two different heights with respect to work assembly 19, and therefore to operate at two different levels on either side of work assembly 19, while keeping work assembly 19 vertical.

Because cutters 31 can be set to a work position and a rest position, underwater vehicles 7, 8, 9, 10 can be withdrawn from the trench without interfering with pipeline 4 being sunk.

The above feature enables one or more underwater vehicles 7, 8, 9, 10—for example, underwater vehicle 10 in FIG. 1—to be used solely for removal, support and sinking work.

Removal and setup of underwater vehicles 7, 8, 9, 10 are also made easier by the variable buoyancy of supporting bodies 45.

Clearly, changes may be made to the embodiment of the present invention as described herein without, however, departing from the scope of the accompanying Claims.

The invention claimed is:

1. A self-propelled underwater vehicle for underground laying a continuous elongated member in a bed of a body of water, the self-propelled underwater vehicle comprising:
   a work assembly configured to be set, at least partly, into the bed, the work assembly including two facing supporting walls for delimiting a space therebetween and supporting two opposite scarp slopes;
   two drive assemblies arranged on opposite sides of the work assembly, the two drive assemblies configured to rest on the bed and advance the work assembly in a travelling direction; and
   two connecting assemblies each of which is located between the work assembly and a respective one of the two drive assemblies to adjust a depth of the work assembly into the body of water, each of the two connecting assemblies including:
   two tracks along a supporting wall;
   two connecting members each of which is fitted to a respective one of the two tracks;
   two first actuators each of which is connected to a respective one of the two connecting members to move the connecting member associated therewith along the respective one of the tracks and with respect to the supporting wall; and
   two articulated joints each of which includes a second actuator for adjusting the distance between the respective one of the two drive assemblies and the work assembly.

2. The self-propelled underwater vehicle as claimed in claim 1, wherein each of the two drive assemblies includes a supporting body of adjustable buoyancy.

3. The self-propelled underwater vehicle as claimed in claim 1, wherein each of the two drive assemblies includes a body of adjustable buoyancy and a powered crawler being looped about the body of adjustable buoyancy.

4. The self-propelled underwater vehicle as claimed in claim 1, wherein the work assembly includes a dredging unit having at least a suction port located in the space between the two facing supporting walls and below the continuous elongated member; and a first outlet port located downstream from the suction port and over the continuous elongated member.

5. The self-propelled underwater vehicle as claimed in claim 4, wherein the work assembly includes an auxiliary dredging unit having at least an inlet port for sucking up water; and at least a second outlet port.

6. The self-propelled underwater vehicle as claimed in claim 1, wherein the work assembly includes a fragmenting unit having cutters configured to be set to a work position and a rest position so as to allow the self-propelled underwater vehicle to withdraw from the trench without interfering with the continuous elongated member.

7. The self-propelled underwater vehicle as claimed in claim 1, wherein each of the two facing supporting walls includes at least a base structure, a vibrating panel connected to the base structure, and an actuator for inducing vibration of the vibrating panel, each of the vibrating panels being positioned contacting a respective soil mass along a respective one of the two opposite scarp slopes.

8. The self-propelled underwater vehicle as claimed in claim 1, wherein each of the two facing supporting walls includes an actuator for inducing vibration of the vibrating panel in a direction crosswise to travelling direction of the self-propelled underwater vehicle.

9. The self-propelled underwater vehicle as claimed in claim 1, further comprising a lubricating device for lubricating outer faces of the two facing supporting walls.

10. The self-propelled underwater vehicle as claimed in claim 1, wherein the work assembly includes a supporting frame having a number of beams each of which exhibits an inverted-U-shape.

11. A system for underground laying the continuous elongated member in the bed of the body of water, the system comprising:
   a plurality of vehicles attached to one another to form a train;
   wherein each of the plurality of vehicles is configured as the self-propelled underwater vehicle of claim 1;
   wherein each of the plurality of vehicles attached to a preceding one of the plurality of vehicles is configured to set the working assembly thereof to a greater depth with respect to a depth of the work assembly of the preceding one of the plurality of vehicles.

* * * * *